United States Patent
Akhtar et al.

(10) Patent No.: US 9,759,183 B2
(45) Date of Patent: Sep. 12, 2017

(54) SYSTEM AND METHOD FOR ATTACHING COMPONENTS TO A WEB IN A WIND TURBINE ROTOR BLADE

(71) Applicant: General Electric Company, Schenectady, NY (US)

(72) Inventors: Afroz Akhtar, Bangalore (IN); Saravakota Sambamurty, Bangalore (IN); Bruce Clark Busbey, Greenville, SC (US); Wilfred A.A.W., Bangalore (IN); Bart Jan Veldkamp, Enschede (NL)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 14/589,014

(22) Filed: Jan. 5, 2015

(65) Prior Publication Data

US 2016/0195060 A1  Jul. 7, 2016

(51) Int. Cl.
| | | |
|---|---|---|
| *F03D 80/40* | (2016.01) | |
| *F03D 1/06* | (2006.01) | |
| *F03D 80/00* | (2016.01) | |

(52) U.S. Cl.
CPC .......... *F03D 1/0658* (2013.01); *F03D 1/0675* (2013.01); *F03D 1/0683* (2013.01);
(Continued)

(58) Field of Classification Search
CPC .......... F03D 80/00; F03D 80/30; F03D 80/40; F03D 1/001; F03D 1/06; F03D 1/065;
(Continued)

(56) References Cited

U.S. PATENT DOCUMENTS

| | | | | |
|---|---|---|---|---|
| 2,503,450 A | * | 4/1950 | Nebesar | B64C 3/00 220/DIG. 23 |
| 3,137,887 A | * | 6/1964 | Mannino | F16B 5/01 16/2.1 |

(Continued)

FOREIGN PATENT DOCUMENTS

| | | | | |
|---|---|---|---|---|
| DE | 102011003602 A1 | * | 8/2012 | .......... F03D 1/0675 |
| WO | WO 2012/076168 A2 | | 6/2012 | |
| WO | WO 2013/023745 A1 | | 2/2013 | |

OTHER PUBLICATIONS

Machine translation of WO 2012/076168; Retrieved from Espacenet on Jan. 17, 2017.*

(Continued)

*Primary Examiner* — Dwayne J White
*Assistant Examiner* — Sang K Kim
(74) *Attorney, Agent, or Firm* — Dority & Manning, P.A.

(57) ABSTRACT

A system and method for mounting a component to an internal web of a wind turbine blade includes, at a first mounting location on the internal web, at least one through-hole defined through the internal web. A bushing is located within the through-hole and is encased within an adhesive applied between the bushing and a wall of the through-hole. A plate is attached to each of the opposite panels of the internal web at the mounting location against an end face of the bushing, with each plate having a hole therein that is aligned with the through-hole. For mounting the component at the mounting location, a bolt is passed completely through the plates and bushing for attachment of a frame of the component to one of the plates.

15 Claims, 6 Drawing Sheets

(52) U.S. Cl.
CPC .............. *F03D 80/00* (2016.05); *F03D 80/40* (2016.05); *Y02E 10/721* (2013.01)

(58) Field of Classification Search
CPC .... F03D 1/0658; F03D 1/0675; F03D 1/0683; Y02E 10/721; B64C 3/18; B64C 3/185; F05B 2240/30; F16B 5/01
See application file for complete search history.

(56) References Cited

U.S. PATENT DOCUMENTS

| | | | | |
|---|---|---|---|---|
| 5,401,138 | A * | 3/1995 | Mosiewicz | F03D 1/0675 |
| | | | | 29/889.21 |
| 6,055,790 | A * | 5/2000 | Lunde | F16B 5/01 |
| | | | | 52/787.1 |
| 6,890,152 | B1 | 5/2005 | Thisted | |
| 7,651,320 | B2 * | 1/2010 | Hansen | H02G 13/00 |
| | | | | 416/1 |
| 8,257,048 | B2 * | 9/2012 | Yarbrough | F03D 1/065 |
| | | | | 244/123.8 |
| 8,317,483 | B2 * | 11/2012 | Gerber | F03D 1/0608 |
| | | | | 416/238 |
| 8,814,485 | B2 * | 8/2014 | Gleason | F16B 13/0808 |
| | | | | 411/344 |
| 2011/0020126 | A1 * | 1/2011 | Glenn | F03D 1/0675 |
| | | | | 416/223 A |
| 2011/0135467 | A1 | 6/2011 | Saddoughi et al. | |

OTHER PUBLICATIONS

Machine translation of DE 10 2011 003602; Retrieved from Espacenet on Jan. 18, 2017.*

* cited by examiner

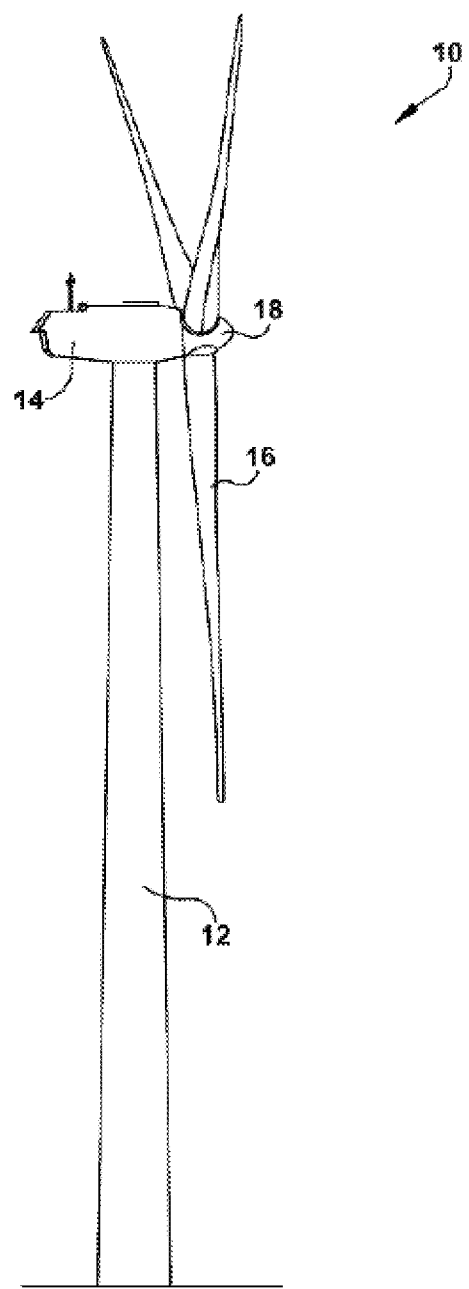
Fig. -1-

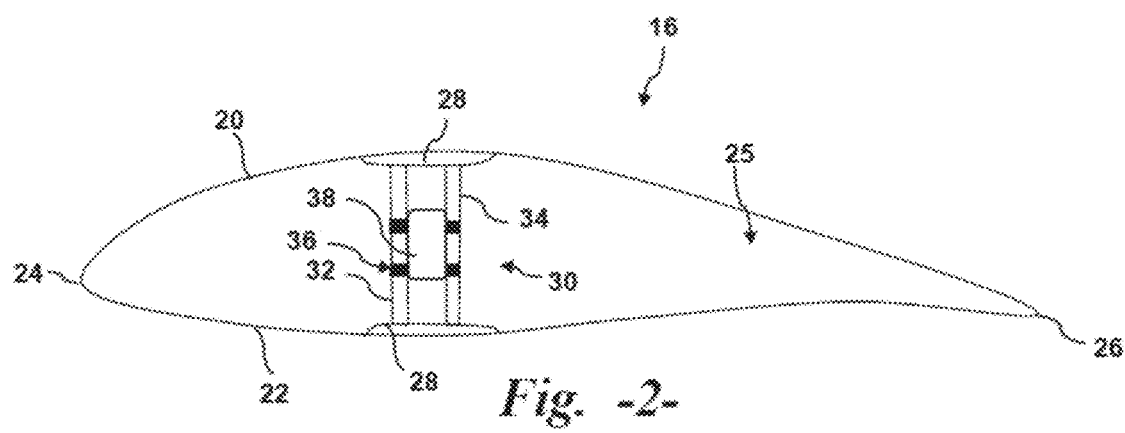
Fig. -2-
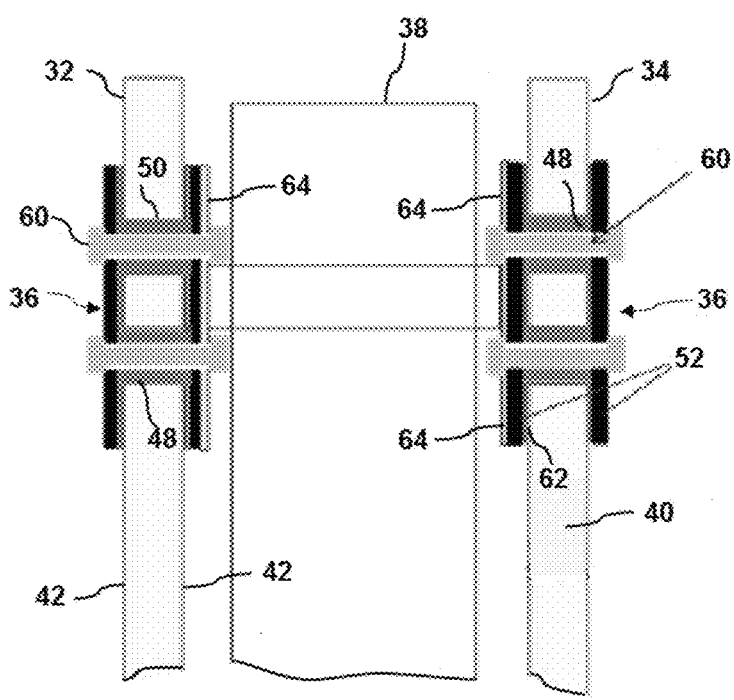
Fig. -3-

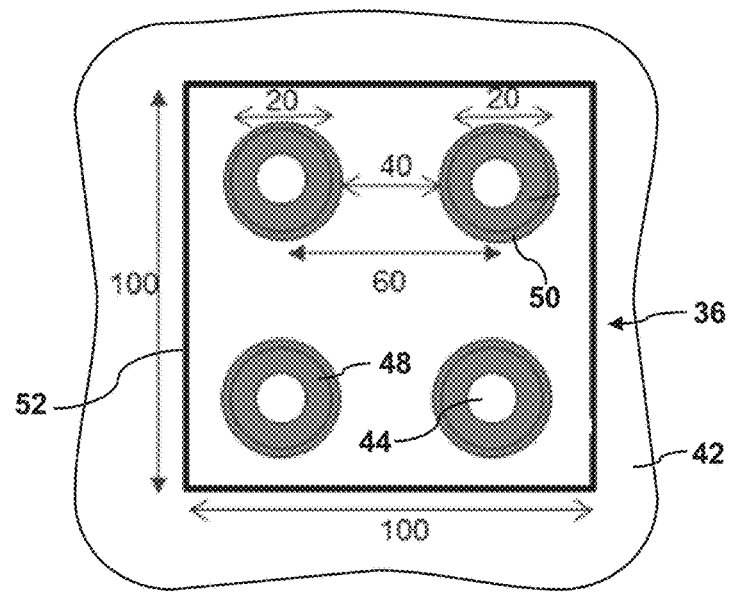
*Fig. -4-*
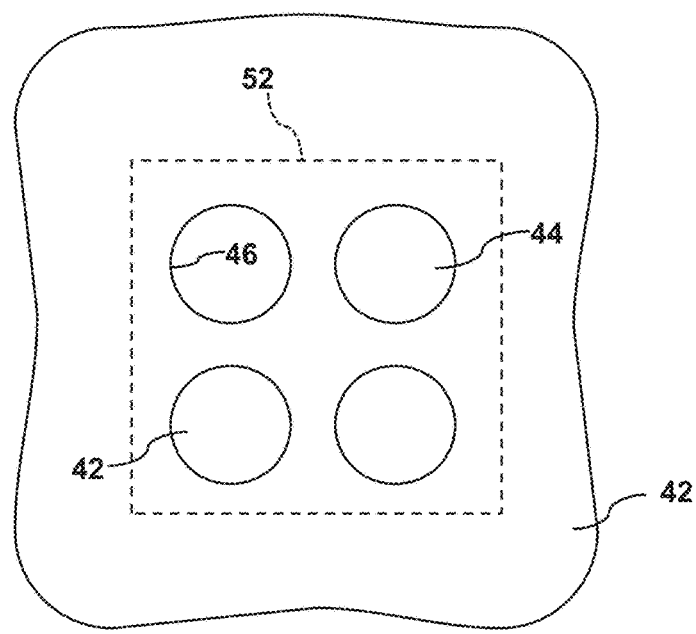
*Fig. -5A-*

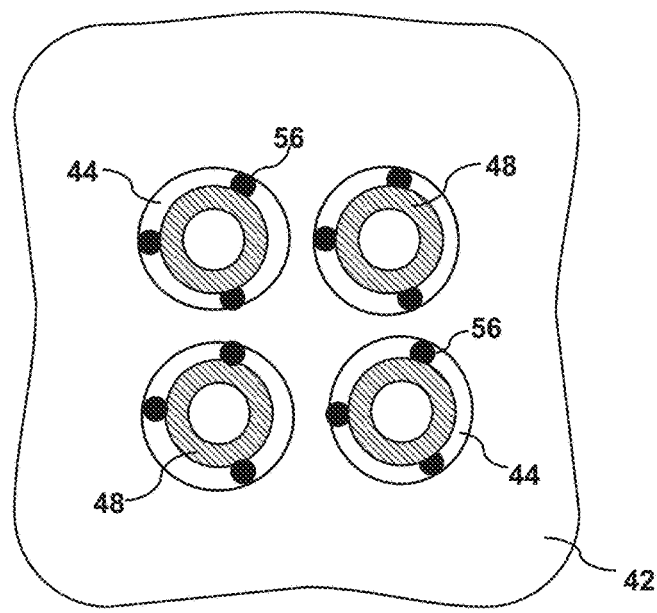
*Fig. -5B-*
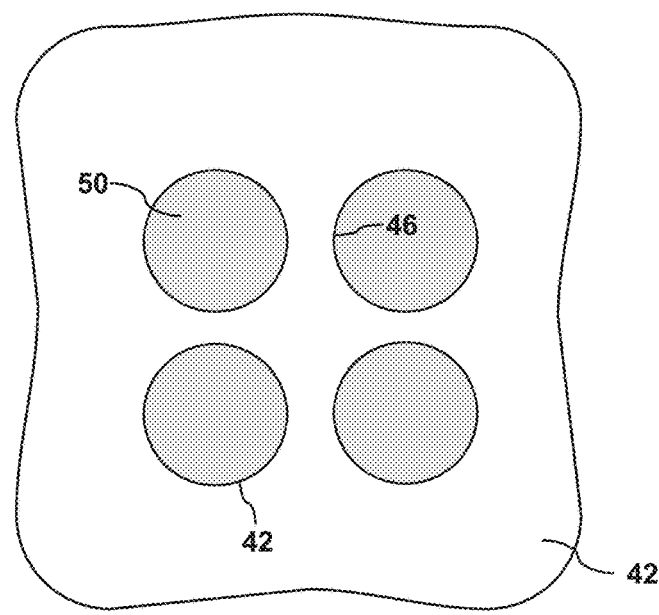
*Fig. -5C-*

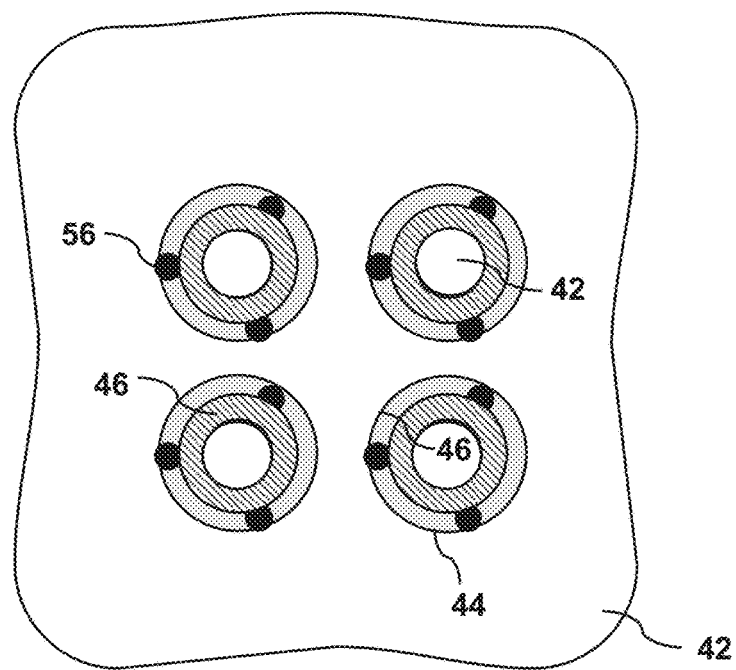
*Fig. -5D-*
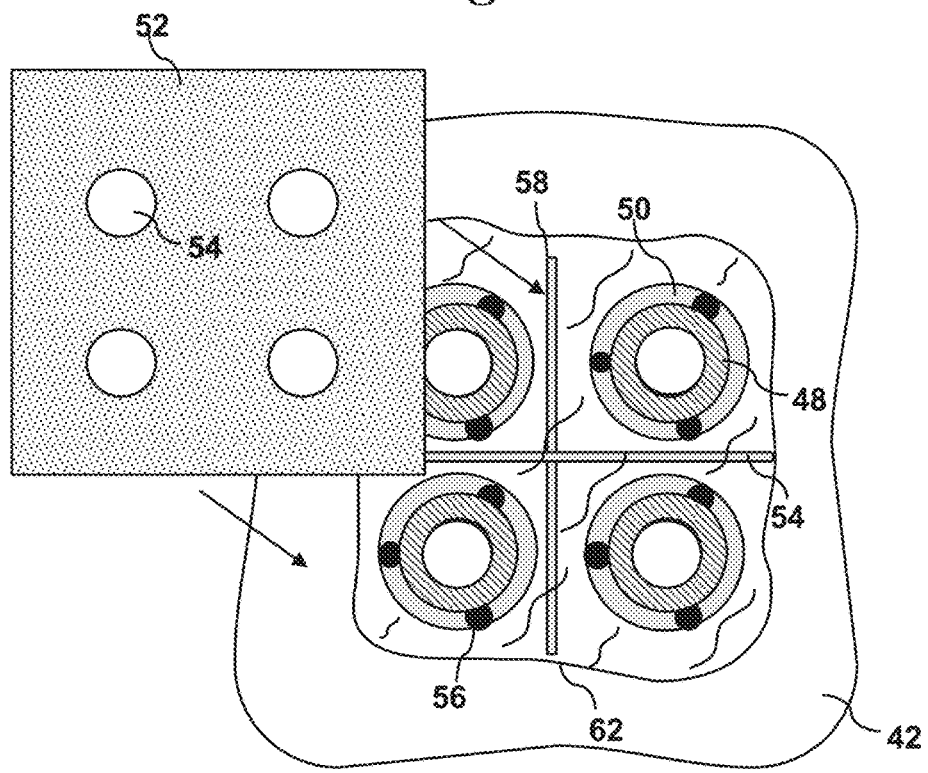
*Fig. -5E-*

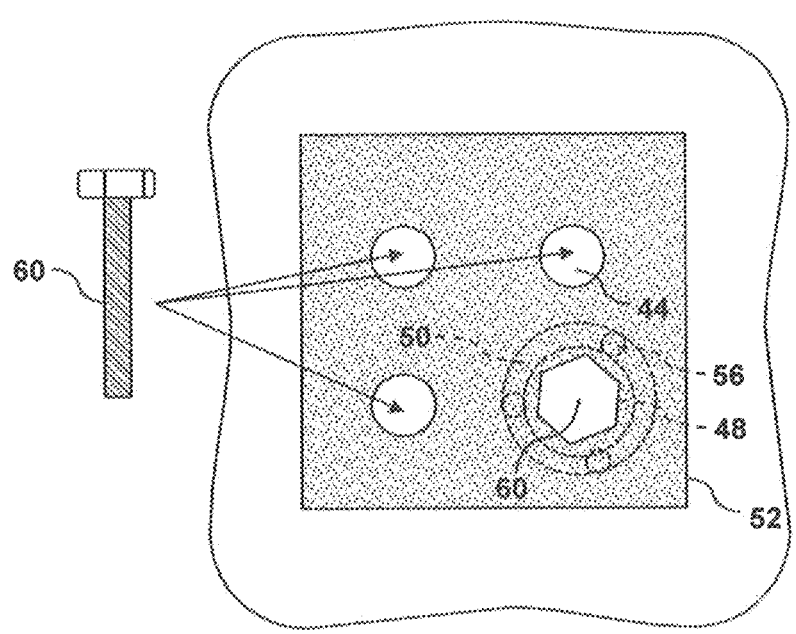
Fig. -5F-

# SYSTEM AND METHOD FOR ATTACHING COMPONENTS TO A WEB IN A WIND TURBINE ROTOR BLADE

FIELD OF THE INVENTION

The present invention relates generally to the field of wind turbines, and more particularly to a system and method for more for attaching components, such as deicing components, to an internal web in a wind turbine rotor blade.

BACKGROUND OF THE INVENTION

Wind turbines have gained increased acceptance as an environmentally safe and relatively inexpensive alternative energy source. With this growing interest, considerable efforts have been made to develop wind turbines that are more reliable, efficient, and easier to maintain.

Generally, a wind turbine includes a rotor having one or more blades. The rotor is mounted on a housing or nacelle, which is positioned on top of a truss or tubular tower. The turbine's blades transform wind energy into a rotational torque or force that drives one or more generators that are rotationally coupled to the rotor through a gearbox. The gearbox steps up the inherently low rotational speed of the turbine rotor for the generator to efficiently convert mechanical energy to electrical energy, which is fed into a utility grid. Gearless direct drive turbines also exist.

It is often necessary to mount certain components to the internal structure of the rotor blades. For example, wind turbines operating in cold climates are typically equipped with a deicing capability, wherein deicing components such as a fan, heater unit and power/control cabinets are mounted to the internal shear webs. It is also a typical practice to mount lighting strike components (e.g., cables, and the like) to the shear webs or other internal structure.

A problem, however, with conventional techniques used to mount the various components to shear webs or other internal structure is that damage often occurs to the sandwich construction of the web, which is typically a foam core between biax laminate panels. When bolts are passed through the webs, the substantial compressive load on the bolts is transferred through the biax laminates to the foam core, tending to crush the foam material and also cause premature delamination of the biax laminate panels. Although it has been attempted to reinforce the mounting location with additional layers of fiberglass, this has not proved successful in preventing collapse of the foam material at the mounting location.

The present invention provides an improved method and system for mounting components to sandwich-type web structures within a wind turbine rotor blade that addresses at least certain of the issues noted above.

BRIEF DESCRIPTION OF THE INVENTION

Aspects and advantages of the invention will be set forth in part in the following description, or may be obvious from the description, or may be learned through practice of the invention.

In accordance with aspects of the invention, a mounting system is configured with an internal web of a wind turbine rotor blade for mounting a component to the web. The system is not limited to any particular component or web structure within the wind turbine rotor blade. The system may have particular usefulness in mounting a deicing cabinet (which may include a heater, blower, and control circuitry, and so forth) onto one or more shear webs within the rotor blade. In this regard, a first internal web within the rotor blade has a core material sandwiched between opposite panels, which is a typical construction for many shear web designs. At a first mounting location on the first internal web, at least one through-hole is defined through the first internal web. A bushing is located within the through-hole and is encased within an adhesive applied between the bushing and a wall of the through-hole. A plate is attached to each of the opposite panels at the first mounting location against an end face of the bushing, with each plate having a hole therein that is aligned with the through-hole and bushing. With this configuration, for mounting a component at the first mounting location, a bolt is passed completely through the plates and bushing for attachment of a frame of the component to one of the plates.

In a certain embodiment, spacers are inserted in the through-hole between the bushing and the through-hole wall, with the spacers also embedded in the adhesive and serving to maintain alignment of the bushing within the through-hole as the adhesive sets. The spacers may be attached to the bushing prior to insertion of the bushing in the through-hole.

The system may be provided with any number or pattern of through-holes and bushings at the first mounting location, with the plates having a corresponding number of aligned holes.

In a particular embodiment, the first internal web is a shear web, which may include a single or double web construction. For example, the shear web may include a second internal web spaced from the first internal web, wherein the component is intended for mounting between the first and the second internal webs. The second internal web may include a second mounting location aligned opposite from the first mounting location with respective through-holes, bushings, adhesive, and plates.

The present invention also encompasses a method for installing a mounting system for attaching a component to an internal web of a wind turbine rotor blade, the internal web having a core material sandwiched between opposite panels, the method comprising. At a mounting location on the internal web, a pattern of one or more through-holes is produced completely through the internal web. The through-holes are then filled with a flowable adhesive material. A bushing is centered within each of the through holes so that the bushing is surrounded by and encased within the adhesive material within the through-hole. An adhesive material is then applied to each of the panels at the mounting location around the pattern of through-holes, and a plate is attached to each of the panels at the mounting location, with each plate having a corresponding pattern of holes that align with the through-holes.

The method may also include passing bolts completely through the plates and bushings, and using the bolts to preload the mounting system during curing of the adhesive materials. The end faces of the bushings may extend beyond the panels such that the plates are pressed directly against the end faces.

Further, the method may include placing a spacer at the mounting location when applying the adhesive material to the panels, the spacer defining a minimum space between the plates and panel that is filled by the adhesive material.

The method may include centering the through-holes with spacers inserted between the bushing and wall of the through-hole, wherein the spacers are encased within the adhesive material. The spacers may be attached to the bushing prior to insertion of the bushing into the through-hole and adhesive material.

An embodiment of the method may include installation of the mounting system on a shear web of the wind turbine rotor blade. For example, the mounting system may be installed on each of spaced apart shear webs of the wind turbine blade such that a component, such as a deicing cabinet, is mounted between the shear webs with use of the respective mounting systems.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine;

FIG. 2 is a cross-sectional view of a wind turbine rotor blade with a component mounted between the internal webs of the shear web;

FIG. 3 is a side view an embodiment of a mounting system in accordance with aspects of the invention;

FIG. 4 is a front view of the mounting system depicted in FIG. 3; and

FIGS. 5A through 5F are sequential construction views of the mounting system depicted in FIG. 4.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a cut-away view of a conventional wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. As is well known in the art, the upper shell member 20, and lower shell member 22 are joined together at the leading edge 24 and trailing edge 26. The blade 16 includes an internal cavity 25 in which various structural members, such as spar caps 28 and a shear web structure 30. In this particular embodiment, the shear web includes a first internal web 32 spaced from a second internal web 34. The construction and function of the internal structural components of the blade 16, such as the spar caps 28 and shear web 30 are well known to those skilled in the art and need not be described in detail herein for an understanding and appreciation of the present invention.

As depicted in FIG. 2, a component 38 is mounted to one or more of the internal blade structures. For example, the component may be mounted between the first and second internal webs 32, 34 of the shear web structure 30 with a mounting system 36 and methodology according to the present invention, and described in more detail below. The invention is not limited to mounting any particular type of component. In a particular embodiment, the component 38 is a deicing unit that includes a heater and blower for circulating hot air within the internal cavity 25 of the blade 16. One or more of these units 38 may be mounted within the blade 16. In a known arrangement, a single deicing unit 38 is generally mounted between the shear webs 32, 34 at about 4-5 meters from the blade root. Although not depicted in the figures, the component 38 may be an electrical cabinet for the deicing system mounted on the root close out platform. In still other embodiments, the system 36 may be used to mount lightning strike protection components to the internal blade webs, such as cable runs, receptors, and so forth.

Referring to FIG. 3, an embodiment of the mounting system 36 is illustrated for mounting the unit 38 between the first internal web 32 and the second internal web 34. Typically, these webs 32, 34 are of a sandwich construction wherein a core material 40, such as a foam material, is sandwiched between opposite panels 42, which may be biax laminate panels. The construction of shear webs and other internal webs of a wind turbine blade 16 are well known to those skilled in the art and need not be described in greater detail herein.

Although the deicing unit or other type of component 38 is depicted in FIG. 3 as mounted to two web structures 32, 34, it should be appreciated that the invention encompasses mounting the component 38 to only one internal web with the mounting system 36.

Referring again to FIG. 3, each system 36 is located at a mounting location on the respective web 32, 34, and includes one or more bushings 48 fitted completely through the panels 42 and core material 40 of each web 32, 34. Reinforcing plates 52, such as steel plates, are attached to the inner and outer panels 42 of each respective web 32, 34 with an adhesive material 62, and bolts 60 pass through the plates 52 and bushing 48 for mounting a frame 64 of the component 38 directly against one of the plates 52. In the illustrated embodiment, the frame 64 is bolted directly to the facing plates 52 of the respective webs 32, 34. With the mounting system 36, the reinforcing plates 52 and bushings 48 take the compressing loads applied at the mounting location, with negligible loads being passed to the web core material 40. The adhesive material 62 between the plates 52 and respective panel 42 take the majoring of shear loads acting on the mounting system 36.

FIGS. 3 and 4 depict four bolts 60 and corresponding bushings 48 associated with each plate 52. FIG. 4 gives dimensions in millimeters (double-arrow lines) of a particular four bushing pattern that may be useful at two separate mounting locations (upper and lower) on each web 32, 34 for mounting a deicing unit 38, as depicted in FIG. 2. It should be appreciated that any number and pattern of bolts 60 and bushings 48 may be configured at each mounting location. The system 36 is not limited to any particular number or pattern of the bushings 48 associated with each plate 52.

Referring to FIGS. 4 through 5F in general, the mounting system 36 includes at least one through-hole 44 defined through the particular internal web 32, 34 at the mounting location. A bushing 48 is located within the through-hole 44 and is encased within an adhesive 50 applied between the bushing 48 and a wall 46 of the through-hole 44. The term "adhesive" is used generically herein to encompass any manner of glue, bonding material, epoxy, or the like, that is applied in a flowable form and hardens into a solid mass to permanent set the bushing 48 within the through-hole 44. As mentioned, a plate 52 is attached to each of the opposite panels 42 at the mounting location against an end face of the bushing 48, as depicted in FIG. 3. Each plate has a hole 54 that is aligned with the through-hole 44. For mounting the component 38 at the mounting location, the bolt 60 is passed completely through the plates 52 and bushing 48 for attachment of the component frame 64 to one of the plates 52.

Referring particularly to FIGS. 5B, 5D, and 5E, the mounting system 36 may include concentrically arranged spacers 56 inserted in the through-hole 44 between the bushing 48 and the through-hole wall 46. The spacers may be, for example, round bards that serve to center and maintain the position of the bushing 48 within the through-hole 44 as the adhesive 50 sets. The spacers 56 thus remain in the through-hole 44 embedded in the adhesive 50 in the final assembly of the mounting system 36. The spacers 56 may be set freely in the through-hole 44 or, in a particular embodiment, are attached (e.g., glued, tack-welded, etc.) to the bushing 48 before the bushing is inserted into the through-hole 44.

As mentioned, the bushings 48 may have a length so that the end faces of the bushing 48 extend beyond the panels 42. In this manner, the reinforcing plate 52 can be attached directly against the bushings 48 with an adhesive material 62 (FIG. 5E) having a minimum design thickness dictated at least by the extension portion of the bushings 48 beyond the panel 42. Referring to FIG. 5E, it may also be desired to include any manner of spacing structure 58, such as bars or ribs, between the panel 42 and plate 52. The spacing structure 58 serves to ensure a uniform application of the adhesive material 62 at the desired thickness, and may also help to prevent slippage of the steel plate 52 as the adhesive material 62 sets.

The sequential views of FIGS. 5A through 5F depict aspects of a method in accordance with the invention for installing a mounting system 36 for attaching a component 38 to an internal web 32, 34 of a wind turbine rotor blade 16, wherein the internal web 32, 34 has a core material 40 sandwiched between opposite panels 42. Referring to FIG. 5A, at a mounting location on the internal web (e.g., on the panel 42), a pattern of one or more through-holes 44 is produced completely through the internal web. The through-holes 44 are spaced and arranged so as to fit within the circumference of a reinforcing plate 52 (depicted in dashed lines in FIG. 5A). The through-holes 44 have an internal wall 46.

Referring to FIG. 5B, in an optional step, the bushings 48 and spacers 56 may be dry-fitted into the through-holes 44 to ensure a proper fit. The bushings 48 and spacers 56 are removed and the through-holes 44 are filled with the flowable adhesive material 50, as depicted in FIG. 5C.

Referring to FIG. 5D, the bushing 48 is then pushed into the adhesive-filled through-hole 44 and centered within the respective through-hole 44 so that the bushing is surrounded by and encased within the adhesive material 50. The spacers 56 may be placed around the bushing 48 to ensure the proper, centered position of the bushing 48 in the through-hole 44 is maintained. Alternatively, as described above, the spacers 56 may be permanently attached to the bushing 48. The adhesive material 50 is prevented from migrating into the bushing 48 during the insertion process.

Referring to FIG. 5E, another adhesive material 62 is then applied to the panel 42 at the mounting location around the pattern of through-holes 44 and inserted bushings 48. Any adhesive 62 that migrates into the bushings 48 may be cleaned by any suitable method. As mentioned, spacer structure 58 may also be set in the adhesive material 62 between and/or around the through-holes 44.

Still referring to FIG. 5E, a reinforcing plate 52 is attached to each of the panels 42 at the mounting location, with each plate having a corresponding pattern of holes 54 that align with the through-holes 44 and bushings 48. The plate 52 is pressed against the end faces of the bushings 48 and the spacing structure 58 and held by the adhesive material 62. Referring to FIG. 5F, a bolt 60 may be passed through each of the plates 52 and sandwiched bushing 48 to pre-load the mounting system 36 as the adhesive materials 50, 62 set. These may be the same bolts 60 that are eventually used to mount the component 38.

As discussed above, an embodiment of the method may include installation of the mounting system 36 on a shear web structure 30 of the wind turbine rotor blade 16. For example, the mounting system may 36 be installed on each of spaced apart shear webs 32, 34 of the wind turbine blade 16 such that a component 38, such as a deicing unit or cabinet 38, is mounted between the shear webs 32, 34 with use of the respective mounting systems 36.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mounting system configured with an internal web of a wind turbine rotor blade for mounting a component to the web, comprising:
   a first internal web within the rotor blade, the first internal web having a core material sandwiched between opposite panels;
   at a first mounting location on the first internal web, at least one through-hole defined through the first internal web;
   a bushing located within the through-hole and encased within an adhesive applied between the bushing and a wall of the through-hole;

a plate attached to each of the opposite panels at the first mounting location against an end face of the bushing, each plate having a hole therein that is aligned with the through-hole;

wherein for mounting a component at the first mounting location, a bolt is passed completely through the plates and bushing for attachment of a frame of the component to one of the plates; and spacers inserted in the through-hole between the bushing and the through-hole wall, the spacers embedded in the adhesive.

2. The mounting system as in claim 1, wherein the spacers are attached to the bushing prior to insertion of the bushing in the through-hole.

3. The mounting system as in claim 1, further comprising a plurality of the through-holes and bushings at the first mounting location, with the plates comprising a corresponding number of aligned holes.

4. The mounting system as in claim 1, wherein the first internal web is a shear web.

5. The mounting system as in claim 4, wherein the shear web includes a second internal web spaced from the first internal web and the component is intended for mounting between the first and the second internal webs, the second internal web comprising a second mounting location aligned opposite from the first mounting location, the second mounting location configured as the first mounting location with a respective through-hole, bushing, adhesive, and plates.

6. A method for installing a mounting system for attaching a component to an internal web of a wind turbine rotor blade, the internal web having a core material sandwiched between opposite panels, the method comprising:

at a mounting location on the internal web, producing a pattern of one or more through-holes completely through the internal web;

fill the through-holes with a flowable adhesive material;

center a bushing within each of the through holes so that the bushing is surrounded by and encased within the adhesive material within the through-hole;

apply additional adhesive material to each of the panels at the mounting location around the pattern of through-holes; and attach a plate to each of the panels at the mounting location, each plate having a corresponding pattern of holes that align with the through-holes.

7. The method as in claim 6, further comprising passing bolts completely through the plates and bushing, and using the bolts to preload the mounting system during curing of the adhesive materials.

8. The method as in claim 7, wherein end faces of the bushings extend beyond the panels such that the plates are pressed directly against the end faces.

9. The method as in claim 8, wherein further comprising placing a spacer at the mounting location when applying the adhesive material to the panels, the spacer-defining a minimum space between the plates and panel filled by the adhesive material.

10. The method as in claim 6, wherein the bushings are centered in the through-holes with spacers inserted between the bushing and wall of the through-hole, the spacers encased within the adhesive material.

11. The method as in claim 10, wherein the spacers are attached to the bushing prior to insertion of the bushing into the through-hole and adhesive material.

12. The method as in claim 6, wherein the mounting system is installed on a shear web of the wind turbine rotor blade.

13. The method as in claim 6, wherein the mounting system is installed on each of spaced apart shear webs of the wind turbine blade such that a component is mounted between the shear webs with use of the respective mounting systems.

14. A method for mounting a component between internal shear webs in a wind turbine rotor blade, the method comprising:

at a mounting location on each of the internal shear webs, producing a pattern of one or more through-holes completely through the internal shear web;

fill the through-holes with a flowable adhesive material;

center a bushing within each of the through holes so that the bushing is surrounded by and encased within the adhesive material within the through-hole;

apply an additional adhesive material to each of the panels at the mounting locations around the pattern of through-holes;

attach a plate to each of the panels at the mounting locations, each plate having a corresponding pattern of holes that align with the through-holes;

locate the component between the internal shear webs at the mounting locations; and bolt a frame member of the component to facing ones of the plates at the mounting locations with bolts that pass completely through the plates and bushings at each respective mounting location such that the component is suspended between the internal shear webs.

15. The method as in claim 14, wherein the component is a deicing cabinet.

* * * * *